(12) United States Patent
Lee

(10) Patent No.: US 8,085,560 B2
(45) Date of Patent: Dec. 27, 2011

(54) POWER SUPPLY APPARATUS

(75) Inventor: Seung-hak Lee, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 575 days.

(21) Appl. No.: 12/103,731

(22) Filed: Apr. 16, 2008

(65) Prior Publication Data

US 2009/0052212 A1  Feb. 26, 2009

(30) Foreign Application Priority Data

Aug. 21, 2007  (KR) .......................... 10-2007-0084069

(51) Int. Cl.
*H02M 3/335* (2006.01)

(52) U.S. Cl. ............. 363/21.15; 363/21.17; 363/21.18

(58) Field of Classification Search .............. 363/21.17, 363/21.18, 21.15
See application file for complete search history.

(56) References Cited

U.S. PATENT DOCUMENTS

| | | | |
|---|---|---|---|
| 6,122,180 A * | 9/2000 | Seo et al. | 363/21.17 |
| 2005/0219776 A1* | 10/2005 | Yamashita | 361/18 |
| 2006/0062028 A1* | 3/2006 | Powers et al. | 363/21.17 |

* cited by examiner

*Primary Examiner* — Jue Zhang
(74) *Attorney, Agent, or Firm* — Staas & Halsey LLP

(57) ABSTRACT

A power supply apparatus includes: a transformer which converts input power supplied to a primary winding to be induced to a secondary winding; a current detector which detects an output current of the secondary winding of the transformer; a voltage detector which detects an output voltage of the secondary winding of the transformer; a switch which adjusts the output voltage outputted by the transformer; and a controller which controls the switch to maintain output power obtained by multiplying the output current by output voltage, within a predetermined level.

12 Claims, 4 Drawing Sheets

POWER SUPPLY APPARATUS

CROSS-REFERENCE TO RELATED APPLICATION

This application claims the benefit of Korean Application No. 2007-84069, filed in the Korean Intellectual Property Office on Aug. 21, 2007, the disclosure of which is incorporated herein by reference.

BACKGROUND OF THE INVENTION

1. Field of the Invention

Aspects of the present invention relate to a power supply apparatus, and more particularly, to a switching mode power supply (SMPS) that prevents damage due to an over voltage or an over current.

2. Description of the Related Art

Generally, a switching mode power supply (SMPS) rectifies AC (alternating current) power inputted from the outside, to be supplied to elements of an electronic device. The SMPS is widely employed in electronic devices, such as a printer.

FIG. 1 is a circuit diagram of a conventional switching mode power supply (SMPS). The conventional SMPS includes a transformer T1, a photocoupler light emitter PD1 and a photocoupler light receiver PT1, a capacitor C1, a control IC, and a switching element Q1. The transformer T1 induces input power converted into DC power by a rectifier to a secondary winding. The photocoupler light emitter PD1 and the photocoupler light receiver PT1 respectively emit and receive light by the induced power of the secondary winding. The capacitor C1 is connected with the photocoupler light receiver PT1 in parallel. The control IC detects a voltage of the capacitor C1. The switching element Q1 is switched by the control IC.

The conventional SMPS limits output power (an output voltage multiplied by an output current of the secondary winding of the transformer T1), within a proper level. Over current protection (OCP) and over voltage protection (OVP) systems can limit the output power. As shown in FIG. 1, if an output current or an output voltage becomes too high compared to a reference value, a control IC controls the switching element (Q1) to stop switching, thereby limiting the output power.

In some cases, however, the output voltage or the output current may remain between the reference value at which the switching operation is suspended and a normal value (the SMPS may operate in an abnormal state). Under this circumstance, if the output power is not properly limited, a continued over voltage or over current may damage the power supply apparatus and a circuit connected to an output terminal of the power supply apparatus.

Thus, if an abnormal over voltage is continuously applied to the secondary winding of the transformer T1 as shown in FIG. 1, the photocoupler light emitter PD1 generates and transmits a light signal to the photocoupler light receiver PT1. A current flows to the photocoupler light receiver PT1, thereby influencing a voltage of the capacitor C1 connected thereto in parallel. The control IC detects the voltage of the capacitor C1 and changes a duty ratio of a pulse width modulation (PWM) signal applied to the primary winding of the transformer T1, based on the detection result. The control IC performs feedback by controlling an output voltage. However, the conventional SMPS does not properly control the continued abnormal current while limiting the output power if the abnormal voltage is continuously applied. A circuit can be damaged if the over current is continuously applied for a long time.

SUMMARY OF THE INVENTION

Aspects of the present invention provide a power supply apparatus that limits output power with a feedback even if an over current is continuously applied as well as an over voltage.

According to an aspect of the present invention, a power supply apparatus is provided. The apparatus comprises a transformer to convert input power supplied to a primary winding so as to induce current in a secondary winding; a current detector to detect an output current of the secondary winding of the transformer; a voltage detector to detect an output voltage of the secondary winding of the transformer; a switch to adjust the output voltage outputted by the transformer; and a controller to control the switch to maintain an output power obtained by multiplying the output current by output voltage to be within a predetermined level.

According to another aspect of the present invention, the controller adjusts the output voltage according to the detected output current to maintain the output power within the predetermined level.

According to another aspect of the present invention, the current detector comprises a current transformer connected to the secondary winding of the transformer to induce the output current according to a turns ratio.

According to another aspect of the present invention, the current detector further comprises a photocoupler light emitter to emit light by a current of the secondary winding of the current transformer, and a photocoupler light receiver coupled to a feedback terminal of the controller to receive the light from the photocoupler light emitter.

According to another aspect of the present invention, the power supply apparatus further comprises a capacitor coupled to the photocoupler light receiver in parallel and having a charging voltage changed by the current flowing in the photocoupler light receiver, wherein the controller detects the charging voltage of the capacitor and controls the switch based on the detection result.

According to another aspect of the present invention, the current detector further comprises a zener diode coupled to the photocoupler light emitter to receive a current if a current level of the secondary winding of the current transformer is greater than or equal to a preset value.

According to another aspect of the present invention, the current transformer reduces the current of the primary winding corresponding to the turns ratio and induces the current to the secondary winding.

According to another aspect of the present invention, the power supply apparatus further comprises a power supply unit to supply AC (alternating current) power and a rectifier to rectify the AC power supplied by the power supply unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
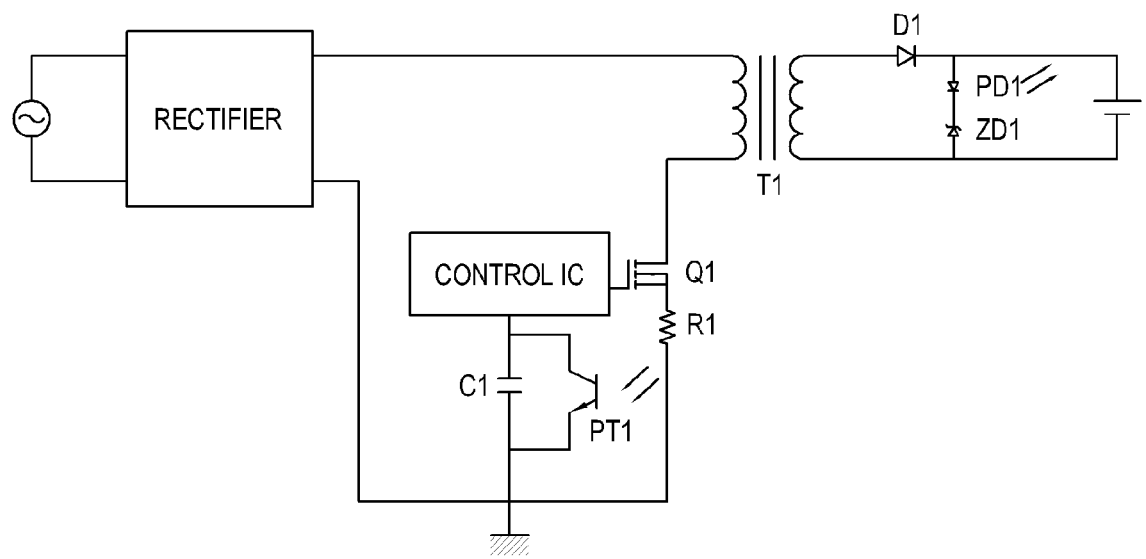
FIG. 1 is a circuit diagram of a conventional switching mode power supply (SMPS)

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
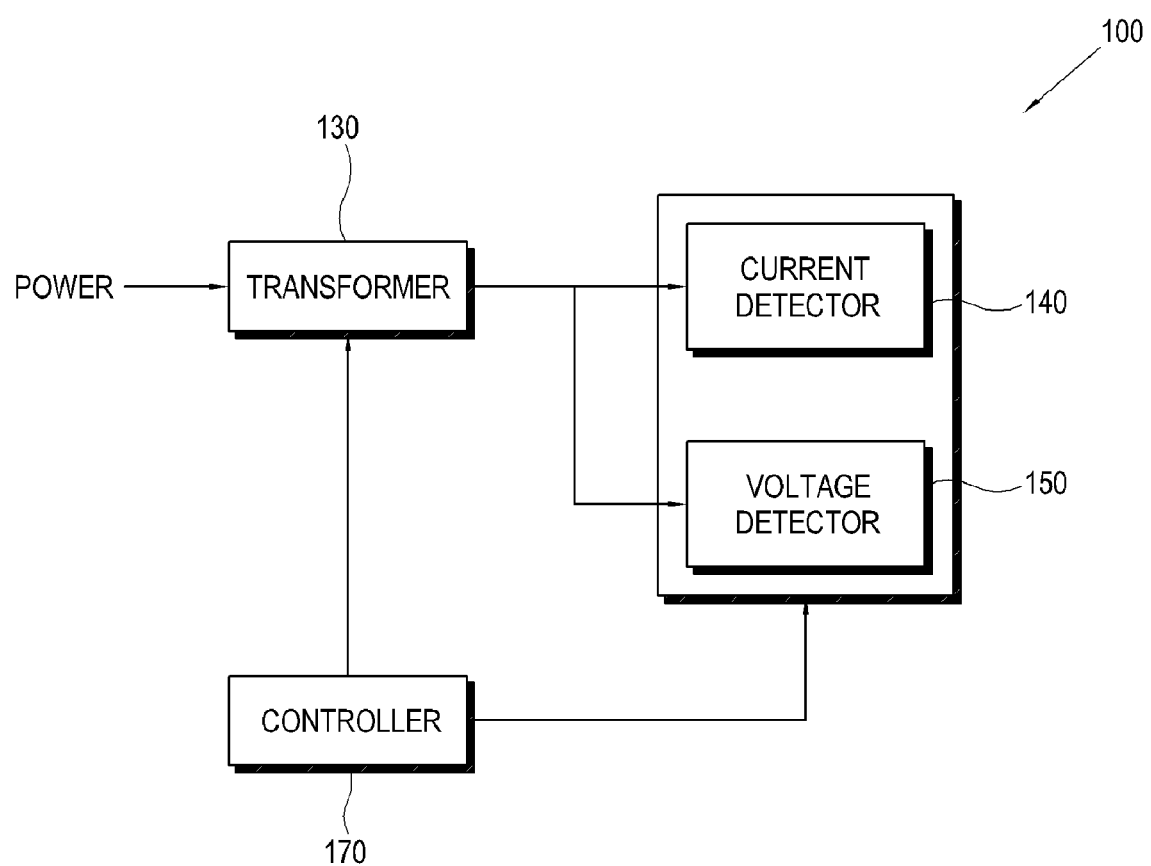
FIGS. 2 and 3 are block diagrams of a power supply apparatus according to an embodiment of the present invention.
Figure 3:
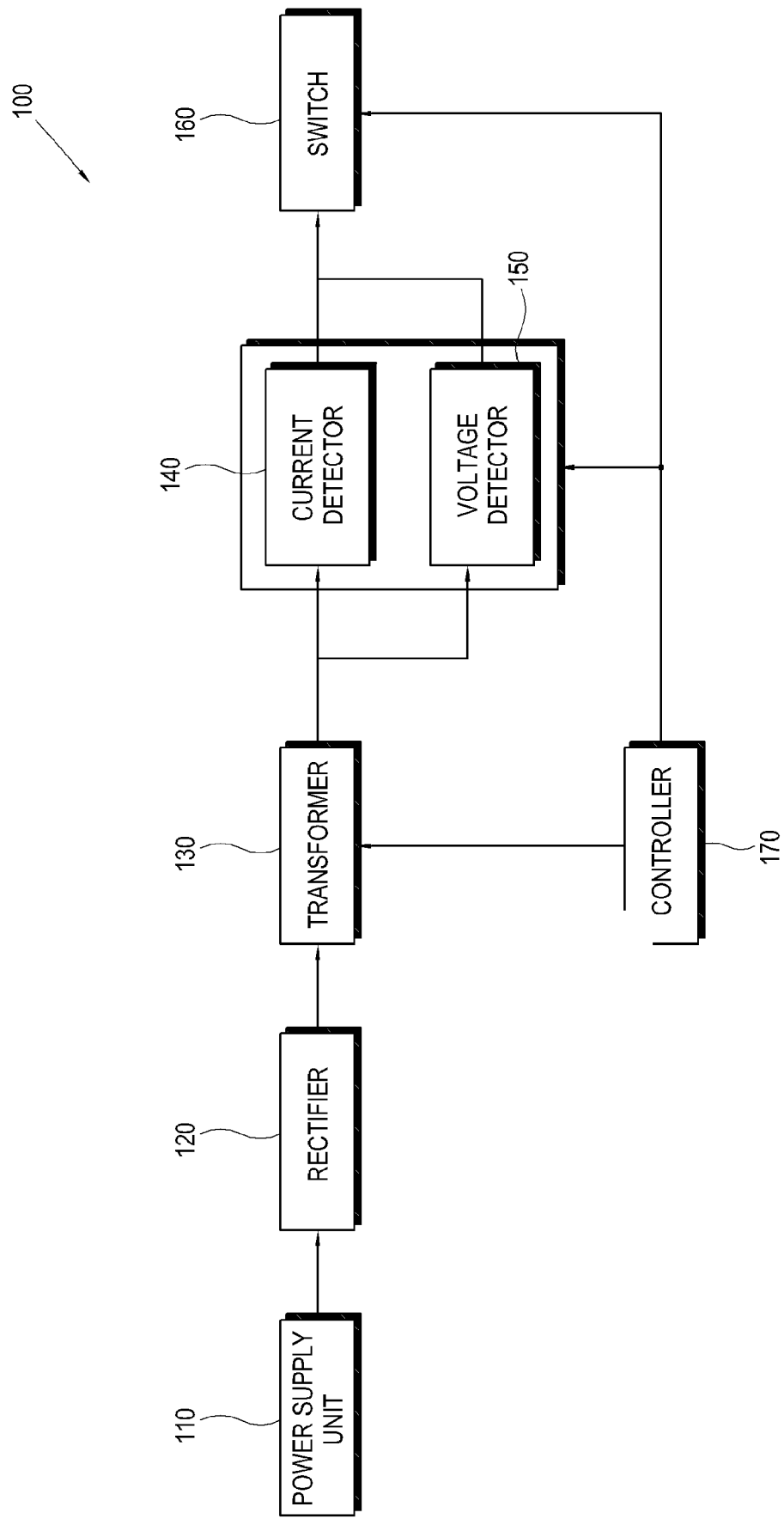

FIGS. 2 and 3 show a power supply apparatus 100 according to an embodiment of the present invention. The power supply apparatus 100 includes a power supply unit 110, a rectifier 120, a transformer 130, a current detector 140, a voltage detector 150, a switch 160, and a controller 170. According to other aspects of the present invention, the power supply apparatus 100 may include additional and/or other units. Similarly, the functionality of two or more of the above units may be integrated into a single component.

The power supply unit 110 receives AC (alternating current) power from an outside source. The rectifier 120 rectifies the AC power supplied by the power supply unit 110 and inputs the rectified power to a primary winding of the transformer 130.

The transformer 130 includes the primary winding and a secondary winding, and converts the input power rectified by the rectifier 120 into output power having a predetermined level. When the rectified input power applied to the primary winding is switched by the switch 160, the AC power is induced from the primary winding to the secondary winding, and a level of the AC power induced to the secondary winding according to a turns ratio of the primary and secondary windings is changed into DC (direct current) power.

The current detector 140 detects a current of the secondary winding (output current) of the transformer 130. The voltage detector 150 detects a voltage of the secondary winding output voltage) of the transformer 130.

The switch 160 switches operations of the transformer 130 according to the level of the output power. The switch 160 may include a switching transistor Q1 that applies a pulse signal to the transformer 130 to adjust the output voltage outputted by the transformer 130. The input power may be applied not only to the primary winding of the transformer 130, but also to a smoothing capacitor and to the switch 160 performing the Pulse Width Modulation (PWM) operation through a starting resistor.

The controller 170 controls the output voltage of the transformer 130 based on an output value of the current detector 140 and the voltage detector 150 so that the output power maintains a predetermined level. Here, the output power is the output voltage multiplied by the output current. The controller 170 determines the output value of the current detector 140 and the voltage detector 150, calculates the output power by multiplying the determined output voltage and output current, and compares the calculated output power with a predetermined reference value.

If the output power is greater than or equal to the predetermined level based on the comparison result of the output power and the reference value, the controller 170 performs a feedback, reducing the output current to maintain the output power corresponding to the over current or over voltage within a particular level. For example, the controller 170 may control the switch 160 to change the duty ratio of the PWM signal applied to the primary winding of the transformer T1 based on the detection result of the current detector 140 and the voltage detector 150. The controller 170 may include a control IC that is connectable with the current detector 140, the voltage detector 150 and the switch 160.

Figure 4:
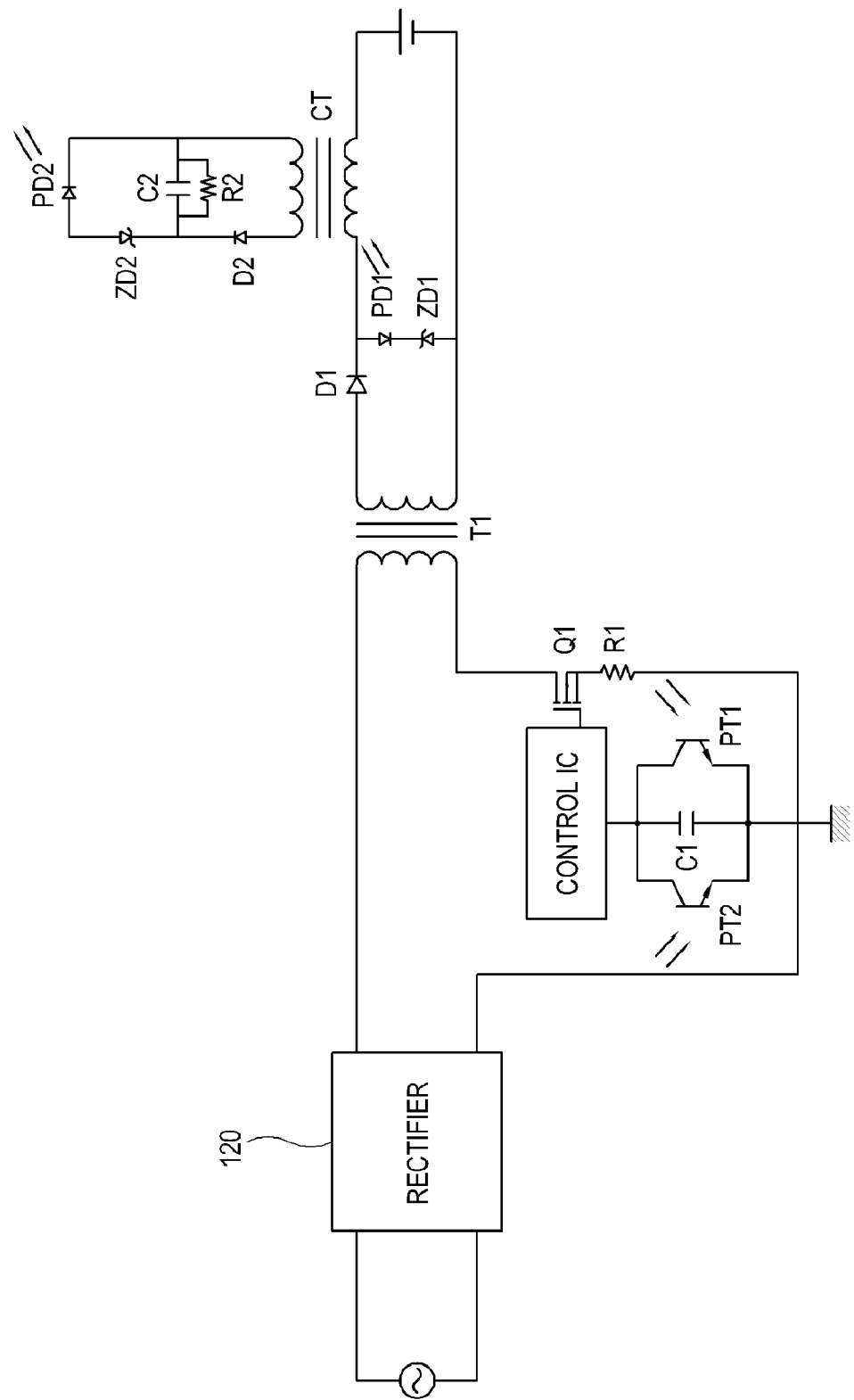
FIG. 4 is a circuit diagram of the power supply apparatus according to an embodiment of the present invention.

The operation of the current detector 140 and the voltage detector 150 according to an embodiment of the present invention will be described with reference to FIG. 4. FIG. 4 is a circuit diagram of the power supply apparatus 100 according to an embodiment of the present invention.

As shown in FIG. 4, the transformer T1 converts the input voltage converted into a direct current (DC) by the rectifier 120 into a predetermined level according to the ratio between the primary and secondary windings. The switching transistor Q1 is turned on/off by an output pulse signal of the pulse width modulator to switch the operation of the transformer T1. The control IC controls the operation of the switching transistor Q1 according to the detection result of the output current and output voltage. While shown in terms of a transistor Q1 and a control IC, other elements may be used to control the transformer T1 in addition to, or instead of, the control IC and the transistor Q1.

The voltage detector 150 includes a first photocoupler light emitter PD1 and a first zener diode ZD1, which are provided in the secondary winding of the transformer T1. The first zener diode ZD1 determines an operating voltage of the first photocoupler light emitter PD1. The voltage detector 150 further includes a first photocoupler light receiver PT1 that is provided in the feedback terminal of the control IC to receive a light signal of the first photocoupler light emitter PD1.

The current detector 140 includes a current transformer CT connected to the secondary winding of the transformer T1, a second photocoupler light emitter PD2 emitting light by a current induced by the current transformer CT, and a second zener diode ZD2 determining an operating current of the second photocoupler light emitter PD2. The current detector 140 further includes a second photocoupler light receiver PT2 provided in the feedback terminal of the control IC to receive a light signal of the second photocoupler light emitter PD2.

A capacitor C1 is connected with the first photocoupler light receiver PT1 and the second photocoupler light receiver PT2 in parallel. The capacitor C1 has a charging voltage that changes depending on the amount of a current applied to the first photocoupler light receiver PT1 or the second photocoupler light receive PT2.

The operation of the power supply apparatus 100 is as follows. First, if the output voltage is greater than or equal to a threshold value of the first zener diode ZD1, the first photocoupler light emitter PD1 receives power. The first zener diode ZD1 prevents a circuit from operating unnecessarily if the output voltage is normal. The output voltage may be set to range from 5V to 24V, but is not limited thereto.

If the output voltage rises to the predetermined level or above, the first photocoupler light emitter PD1 starts emitting light. The light signal generated by the first photocoupler light emitter PD1 is transmitted to the first photocoupler light receiver PT1. A current is applied to the first photocoupler light receiver PT1, thereby influencing the charging voltage of the capacitor C1 connected thereto in parallel. If the output voltage maintains the predetermined level or above (if the over voltage is continuously applied), the charging voltage of the capacitor C1 is reduced.

The control IC detects the voltage of the capacitor C1. If the charging voltage is reduced, the control IC controls the switching transistor Q1 to reduce the output voltage. Then, the output power maintains the predetermined level. Thus, the power supply apparatus 100 may be protected from over voltage.

In the case of the current, the current transformer CT induces the output current to the secondary winding corresponding to a predetermined turns ratio. The turns ratio is represented by a following formula 1.

Turns ratio ($X$)=the number of turns on secondary winding/the number of turns on primary winding    Formula 1

The current transformer CT may lower the level of the current of the primary winding corresponding to the predetermined turns ratio and induce the current to the secondary winding. The turns ratio may be set to 0.1, and the current of the primary winding may be set to maintain 3 A. According to other aspects of the invention, the turns ratio and the current may be set to other values.

The current of the secondary winding of the current transformer CT may be determined by the turns ratio of the primary and secondary windings according to a following formula 2.

Current of secondary winding=(the number of turns on secondary winding/the number of turns on primary winding)*current of primary winding    Formula 2

Here, the current of the secondary winding of the current transformer CT may be set based on the minimum operating current of the second photocoupler light emitter PD2. For example, if the turns ratio of the current transformer CT is set as 0.1 and the current of the primary winding of the current transformer CT is 3 A, a current of 30 mA may be induced to the secondary winding of the current transformer CT according to the formula 2.

If an over current of 3.5 A or above flows to the primary winding of the current transformer CT, 0.1 is set as the turns ratio to control the current of the secondary winding to be 35 mA. The current of the secondary winding is set to have a lower value than that of the primary winding, thereby reducing current loss.

If the current of the secondary winding of the current transformer CT is greater than or equal to a threshold value of the second zener diode ZD2, a current is applied to the second photocoupler light emitter PD2. The second zener diode ZD2 prevents a circuit from operating unnecessarily if the output current is normal. For example, if the over current of the secondary winding is set as 35 mA and R2 is 10 ohm, the threshold value of the second zener diode ZD2 is 35 mA*10 Ohm=3.5V.

If the supplied current rises to the predetermined level or above, the second photocoupler light emitter PD2 starts emitting light. The light signal generated by the second photocoupler light emitter PD2 is transmitted to the second photocoupler light receiver PT2. A current is applied to the second photocoupler light receiver PT2, thereby influencing the charging voltage of the capacitor C1 connected thereto in parallel.

If the current of the secondary winding of the current transformer CT remains at the predetermined level or above (if the over current is continuously applied), the charging voltage of the capacitor C1 is reduced. The control IC detects the voltage of the capacitor C1. If the charging voltage is reduced, the control IC controls the switching transistor Q1 to reduce the output voltage. Then, the output power maintains the predetermined level. For example, if the normal voltage is 5V and if the normal current is 3 A, the output power according to an embodiment of the present invention is controlled to maintain 5 V*3 A=15 W.

Then, the power supply apparatus 100 indirectly detects and controls the output current through the current transformer CT to be protected from the over current. The current transformer CT serves as an inductor of the secondary winding of the transformer T1, thereby reducing a ripple current and controlling to stably supply a current to a load.

As described above, the power supply apparatus according to aspects of the present invention may limit output power according to a feedback operation even if an over current is continuously applied as well as an over voltage. Also, the power supply apparatus may prevent a circuit from being damaged due to an over voltage or over current continued for a long time. Further, the current transformer of the power supply apparatus serves as an inductor of an output terminal thereof, thereby reducing a ripple current and controlling to stably supply a current to a load. While described as being usable in an image forming apparatus, other aspects of the invention may employ elements of the power supply with other types of electronic apparatuses.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A power supply apparatus, comprising:
   a transformer to convert input power supplied to a primary winding so as to induce an output current and an output voltage in a secondary winding;
   a current detector to detect the output current of the secondary winding of the transformer;
   a voltage detector to detect the output voltage of the secondary winding of the transformer;
   a switch to adjust the output voltage outputted by the transformer; and
   a controller to control the switch to maintain an output power of the transformer obtained by multiplying the output current by the output voltage to be within a predetermined level,
   wherein
   the current detector comprises
       a current transformer connected to the secondary winding of the transformer to induce the output current according to a turns ratio,
       a photocoupler light emitter to emit light by a current of the secondary winding of the current transformer, and
       a photocoupler light receiver coupled to a feedback terminal of the controller to receive the light from the photocoupler light emitter.

2. The power supply apparatus according to claim 1, wherein the controller adjusts the output voltage according to the detected output current to maintain the output power within the predetermined level.

3. The power supply apparatus according to claim 1, further comprising:
   a capacitor coupled to the photocoupler light receiver in parallel and having a charging voltage changed by the current flowing in the photocoupler light receiver;
   wherein the controller detects the charging voltage of the capacitor and controls the switch based on the detection result.

4. The power supply apparatus according to claim 1, wherein the current detector further comprises a zener diode coupled to the photocoupler light emitter to receive a current if a current level of the secondary winding of the current transformer is greater than or equal to a preset value.

5. The power supply apparatus according to claim 1, wherein the current transformer reduces the current of the primary winding corresponding to the turns ratio and induces the current to the secondary winding.

6. The power supply apparatus according to claim 1, further comprising:
   a power supply unit to supply AC (alternating current) power; and
   a rectifier to rectify the AC power supplied by the power supply unit.

7. The power supply apparatus according to claim 2, wherein the switch comprises a switching transistor to adjust the output voltage according to the detected output current.

8. The power supply apparatus according to claim 1, wherein the voltage detector comprises:
   a photocoupler light emitter to emit light when the output voltage is greater than or equal to a predetermined voltage;
   a photocoupler light receiver to detect the light emitted from the photocoupler light emitter;
   wherein the controller adjusts the switch based on the light detected by the photocoupler light detector so as to control the output voltage to be lower than the predetermined voltage.

9. The power supply apparatus according to claim 8, wherein the apparatus further comprises:
   a zener diode coupled to the photocoupler light emitter to receive a voltage if the output voltage is greater than the predetermined voltage.

10. The power supply apparatus according to claim 8, wherein the apparatus comprises:
    a capacitor connected to the photocoupler light receiver in parallel and having a charging voltage changed by current flowing in the photocoupler light receiver;
    wherein the controller controls the switch based on the charging voltage of the capacitor.

11. The power supply apparatus according to claim 8, wherein the switch comprises a switching transistor to adjust the output voltage according to the detected output current.

12. A power supply apparatus, comprising:
    a transformer to convert input power supplied to a primary winding so as to induce an output current and an output voltage in a secondary winding;
    a current detector to detect the output current of the secondary winding of the transformer;
    a voltage detector to detect the output voltage of the secondary winding of the transformer;
    a switch to adjust the output voltage outputted by the transformer; and
    a controller to control the switch to maintain an output power of the transformer obtained by multiplying the output current by the output voltage to be within a predetermined level,
wherein:
    the voltage detector comprises a first photocoupler light emitter to emit light when the output voltage is greater than or equal to a first predetermined voltage, and a first photocoupler light receiver to receive the light emitted from the first photocoupler light emitter;
    the current detector comprises a second photocoupler light emitter to emit light when the output current is greater than or equal to a second predetermined value, and a second photocoupler light receiver coupled to a feedback terminal of the controller to receive the light from the photocoupler light emitter;
    the power supply apparatus further comprises a capacitor coupled to the first photocoupler light receiver and the second photocoupler light receiver in parallel; and
    the controller controls the switch based on a charging voltage of the capacitor and a charging current of the capacitor.

* * * * *